(12) United States Patent
Balasubramanian et al.

(10) Patent No.: US 8,650,118 B2
(45) Date of Patent: *Feb. 11, 2014

(54) UNIVERSAL MERCHANT PLATFORM FOR PAYMENT AUTHENTICATION

(75) Inventors: Chandra S. Balasubramanian, Lakewood, OH (US); Francis M. Sherwin, Cleveland Heights, OH (US); Michael A. Keresman, Kirtland Hills, OH (US)

(73) Assignee: CardinalCommerce Corporation, Mentor, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/423,557

(22) Filed: Mar. 19, 2012

(65) Prior Publication Data

US 2012/0197760 A1 Aug. 2, 2012

Related U.S. Application Data

(63) Continuation of application No. 12/720,857, filed on Mar. 10, 2010, now Pat. No. 8,140,429, which is a continuation of application No. 11/419,829, filed on May 23, 2006, which is a continuation-in-part of application No. 10/459,849, filed on Jun. 12, 2003.

(60) Provisional application No. 60/388,094, filed on Jun. 12, 2002.

(51) Int. Cl.
*G06Q 40/00* (2012.01)

(52) U.S. Cl.
USPC .............................. 705/38; 705/35

(58) Field of Classification Search
USPC ..................................... 705/35, 38
See application file for complete search history.

(56) References Cited

U.S. PATENT DOCUMENTS 3,806,874 A 4/1974 Ehrat 4,720,860 A 1/1988 Weiss
(Continued)

FOREIGN PATENT DOCUMENTS

EP   0 668 579 A2   8/1995
EP   1 107 198 B1   6/2001
(Continued)

OTHER PUBLICATIONS

Bürk, et al., "Value Exchange Systems Enabling Security and Unobservability," Elsevier Science Publishers, vol. 9, No. 8, Dec. 1990, pp. 715-721.
(Continued)

*Primary Examiner* — Kirsten Apple
(74) *Attorney, Agent, or Firm* — Fay Sharpe LLP

(57) ABSTRACT

A method is provided for supporting processing of a transaction conducted between two parties. The method includes: receiving payment information over a communications network at a server operatively connected to the network, the payment information identifying a particular payment option used by the second party for the transaction, and the server being equipped to format and route messages over the network in different manners to accommodate the different authentication protocols; determining from the payment information received which of the different authentication protocols is prescribed for the type of payment option identified in the payment information; selecting a particular authentication protocol from the plurality of different authentication protocols supported by the server; and, obtaining an authentication determination for the transaction in accordance with the selected authentication protocol, including formatting messages and routing the formatted messages over the network in accordance with the mandates of the selected authentication protocol.

27 Claims, 3 Drawing Sheets

(56) References Cited

U.S. PATENT DOCUMENTS

| | | | |
|---|---|---|---|
| 4,747,050 A | 5/1988 | Brachtl et al. | |
| 4,799,156 A | 1/1989 | Shavit et al. | |
| 4,800,590 A | 1/1989 | Vaughan | |
| 4,885,778 A | 12/1989 | Weiss | |
| 5,168,520 A | 12/1992 | Weiss | |
| 5,233,655 A | 8/1993 | Shapiro | |
| 5,237,614 A | 8/1993 | Weiss | |
| 5,251,259 A | 10/1993 | Mosley | |
| 5,317,636 A | 5/1994 | Vizcaino | |
| 5,361,062 A | 11/1994 | Weiss et al. | |
| 5,450,491 A | 9/1995 | McNair | |
| 5,478,994 A | 12/1995 | Rahman et al. | |
| 5,479,512 A | 12/1995 | Weiss | |
| 5,485,519 A | 1/1996 | Weiss | |
| 5,490,251 A | 2/1996 | Clark et al. | |
| 5,491,752 A | 2/1996 | Kaufman et al. | |
| 5,544,246 A | 8/1996 | Mandelbaum et al. | |
| 5,557,518 A | 9/1996 | Rosen | |
| 5,590,038 A | 12/1996 | Pitroda | |
| 5,590,197 A | 12/1996 | Chen et al. | |
| 5,627,355 A | 5/1997 | Rahman et al. | |
| 5,657,388 A | 8/1997 | Weiss | |
| 5,671,279 A | 9/1997 | Elgamal | |
| 5,715,314 A | 2/1998 | Payne et al. | |
| 5,742,684 A | 4/1998 | Labaton et al. | |
| 5,757,917 A | 5/1998 | Rose et al. | |
| 5,761,306 A | 6/1998 | Lewis | |
| 5,781,632 A | 7/1998 | Odom | |
| 5,790,667 A | 8/1998 | Omori et al. | |
| 5,790,677 A | 8/1998 | Fox et al. | |
| 5,809,144 A | 9/1998 | Sirbu et al. | |
| 5,815,665 A | 9/1998 | Teper et al. | |
| 5,825,881 A | 10/1998 | Colvin, Sr. | |
| 5,826,245 A | 10/1998 | Sandberg-Diment | |
| 5,884,271 A | 3/1999 | Pitroda | |
| 5,884,288 A | 3/1999 | Chang et al. | |
| 5,887,065 A | 3/1999 | Audebert | |
| 5,909,492 A | 6/1999 | Payne et al. | |
| 5,913,203 A | 6/1999 | Wong et al. | |
| 5,937,068 A | 8/1999 | Audebert | |
| 5,937,394 A | 8/1999 | Wong et al. | |
| 5,956,699 A | 9/1999 | Wong et al. | |
| 5,988,497 A | 11/1999 | Wallace | |
| 5,991,411 A | 11/1999 | Kaufman et al. | |
| 5,991,413 A | 11/1999 | Arditti et al. | |
| 5,995,626 A | 11/1999 | Nishioka et al. | |
| 5,999,624 A | 12/1999 | Hopkins | |
| 5,999,626 A | 12/1999 | Mullin et al. | |
| 6,005,939 A | 12/1999 | Fortenberry et al. | |
| 6,014,650 A | 1/2000 | Zampese | |
| 6,018,724 A * | 1/2000 | Arent | 705/44 |
| 6,026,166 A | 2/2000 | Lebourgeois | |
| 6,029,150 A | 2/2000 | Kravitz | |
| 6,070,150 A | 5/2000 | Remington et al. | |
| 6,092,053 A | 7/2000 | Boesch et al. | |
| 6,272,492 B1 | 8/2001 | Kay | |
| 6,366,893 B2 | 4/2002 | Hannula et al. | |
| 6,519,571 B1 | 2/2003 | Guheen et al. | |
| 6,529,886 B1 | 3/2003 | Campana et al. | |
| 6,560,581 B1 | 5/2003 | Fox et al. | |
| 6,675,153 B1 | 1/2004 | Cook et al. | |
| 7,003,480 B2 | 2/2006 | Fox et al. | |
| 7,003,789 B1 | 2/2006 | Linehan | |
| 7,051,002 B2 | 5/2006 | Keresman, III et al. | |
| 7,058,611 B2 | 6/2006 | Kranzley et al. | |
| 7,089,208 B1 | 8/2006 | Levchin et al. | |
| 7,111,789 B2 | 9/2006 | Rajasekaran et al. | |
| 7,120,609 B1 | 10/2006 | Kerkdijk | |
| 7,133,843 B2 | 11/2006 | Hansmann et al. | |
| 7,133,846 B1 | 11/2006 | Ginter et al. | |
| 7,191,151 B1 | 3/2007 | Nosek | |
| 7,249,094 B2 | 7/2007 | Levchin et al. | |
| 7,349,557 B2 | 3/2008 | Tibor | |
| 7,469,341 B2 | 12/2008 | Edgett et al. | |
| 7,546,944 B2 | 6/2009 | Goldberg et al. | |
| 7,647,252 B2 | 1/2010 | Rampell et al. | |
| 7,788,139 B2 | 8/2010 | Rampell et al. | |
| 7,996,324 B2 | 8/2011 | Bishop et al. | |
| 2001/0032878 A1 | 10/2001 | TSiounis | |
| 2003/0130958 A1 | 7/2003 | Narayanan et al. | |
| 2003/0200172 A1* | 10/2003 | Randle et al. | 705/39 |
| 2005/0164739 A1 | 7/2005 | Goldberg et al. | |
| 2005/0256802 A1 | 11/2005 | Ammermann et al. | |
| 2006/0149665 A1 | 7/2006 | Weksler | |
| 2006/0235758 A1 | 10/2006 | Schleicher | |
| 2006/0282382 A1 | 12/2006 | Balasubramanian et al. | |
| 2008/0028228 A1* | 1/2008 | Mardikar et al. | 713/184 |
| 2008/0033878 A1 | 2/2008 | Krikorian et al. | |
| 2008/0168544 A1* | 7/2008 | von Krogh | 726/6 |
| 2010/0153200 A1 | 6/2010 | Thomas | |
| 2011/0047054 A1 | 2/2011 | Ginter et al. | |
| 2011/0258090 A1 | 10/2011 | Bosch et al. | |
| 2012/0016728 A1 | 1/2012 | Ahmad et al. | |
| 2012/0116933 A1 | 5/2012 | Matthews et al. | |

FOREIGN PATENT DOCUMENTS

| | | |
|---|---|---|
| EP | 1 134 707 A1 | 9/2001 |
| JP | 60-079466 | 5/1985 |
| WO | WO 93/04425 | 3/1993 |
| WO | WO 00/01108 A | 1/2000 |
| WO | WO 01/18719 A1 | 3/2001 |
| WO | WO 01/18720 A1 | 3/2001 |
| WO | WO 01/26062 A1 | 4/2001 |
| WO | WO 01/46918 A2 | 6/2001 |
| WO | WO 01/78493 A3 | 10/2001 |
| WO | WO 01/80100 A1 | 10/2001 |
| WO | 01/82246 | 11/2001 |
| WO | WO 01/82246 A | 11/2001 |
| WO | 02/25604 | 3/2002 |
| WO | WO 02/44976 A2 | 6/2002 |
| WO | WO 03/107242 A1 | 12/2003 |

OTHER PUBLICATIONS

David Chaum, "Security Without Identification: Transaction Systems to Make Big Brother Obsolete," Communications of the ACM, vol. 28, No. 10, Oct. 1985, pp. 1030-1044.

David Chaum, "Achieving Electronic Privacy," Scientific American, vol. 267, No. 2, Aug. 1992, pp. 76-81.

Exhibit AW2 to the statutory declaration of Andrew Weller Jan. 15, 2009—Joint press release issued by Visa and other technology providers (Jun. 27, 2001).

Exhibit BB4 to the statutory declaration of Bahram Boutorabi Jan. 27, 2009—*An Introduction to Authentication* (GPayment white paper—2000-2002).

Exhibit BB5 to the statutory declaration of Bahram Boutorabi Jan. 27, 2009—*Authentication* (GPayment white paper—2000-2002).

Exhibit BB6 to the statutory declaration of Bahram Boutorabi Jan. 27, 2009—*Smart Payment Technology* (GPayment white paper—2000-2002).

Exhibit BB7 to the statutory declaration of Bahram Boutorabi Jan. 27, 2009—*Electronic Wallets: Past, Present and Future* (GPayment white paper—2000-2002).

Exhibit BB8 to the statutory declaration of Bahram Boutorabi Jan. 27, 2009—*Pseudo Card Numbers* (GPayment white paper—2000-2002).

Exhibit BB9 to the statutory declaration of Bahram Boutorabi Jan. 27, 2009—Cached version of www.gpayments.com (May 11, 2002).

Exhibit BB10 to the statutory declaration of Bahram Boutorabi Jan. 27, 2009—Presentation entitled ActiveAccess Overview (Nov. 22, 2001).

Exhibit BB11 to the statutory declaration of Bahram Boutorabi Jan. 27, 2009—GPayments paper outlining authentication products (May 29, 2002).

Exhibit BB13 to the statutory declaration of Bahram Boutorabi Apr. 7, 2009—*3-D Secure Vendor Forum* (Visa presentation—Nov. 2, 2000).

Exhibit BB14 to the statutory declaration of Bahram Boutorabi Apr. 7, 2009—*3-D Secure Payment Authorisation* (Visa presentation—Jan. 25, 2001).

(56) References Cited

OTHER PUBLICATIONS

Exhibit BB15 to the statutory declaration of Bahram Boutorabi Apr. 7, 2009—*3-D Secure Vendor Forum* (Visa presentation—Jan. 25, 2001).
Exhibit BB16 to the statutory declaration of Bahram Boutorabi Apr. 7, 2009—*3-D Secure Interoperability Center* (Visa presentation—Jan. 25, 2001).
Exhibit BB17 to the statutory declaration of Bahram Boutorabi Apr. 7, 2009—Wikipedia Plug-In article (as at Apr. 7, 2009).
Exhibit BB18 to the statutory declaration of Bahram Boutorabi Apr. 7, 2009—*ActivePayment* (GPayment presentation—Feb. 7, 2000).
Exhibit BB19 to the statutory declaration of Bahram Boutorabi Apr. 7, 2009—*Eliminating Payment Fraud* (GPayment presentation—Apr. 16, 2002).
Exhibit BB20 to the statutory declaration of Bahram Boutorabi Apr. 7, 2009—*Authentication and Payment in Asia Pacific* (GPayment presentation—May 2, 2002).
Exhibit BB21 to the statutory declaration of Bahram Boutorabi Apr. 7, 2009—*VeriSign Conference Call and Online Demonstration* (GPayments presentation—May 21, 2002).
Exhibit BB22 to the statutory declaration of Bahram Boutorabi Apr. 7, 2009—Cached version of www.cyota.com (Feb. 13, 2002).
Exhibit BB23 to the statutory declaration of Bahram Boutorabi Apr. 7, 2009—PC-EFTPOS website (as at Apr. 7, 2009).
Exhibit BB24 to the statutory declaration of Bahram Boutorabi Apr. 7, 2009—OCV Implementation Suggestions (Oct. 22, 1999).
Exhibit BB25 to the statutory declaration of Bahram Boutorabi Mar. 5, 2010—GPayments ActiveAccess Overview (Apr. 16, 2002).
Exhibit BB26 to the statutory declaration of Bahram Boutorabi Mar. 5, 2010—Screen captures from Visa-certified version of GPayments (May 23, 2002).
Exhibit BB27 to the statutory declaration of Bahram Boutorabi Mar. 5, 2010—Schedule of certification of ActiveMerchant and ActiveAccess (Jun. 12, 2002).
Exhibit BB28 to the statutory declaration of Bahram Boutorabi Mar. 5, 2010—Presentation given at Sun Microsystems (May 2002).
Hamann et al. "Securing E-Business Applications Using Smart Cards," IBM Systems Journal, 2001. vol. 40, No. 3, pp. 635-647. [Accessed May 29, 2013—ProQuest] http://search.proquest.com/docview/222422057.
Karpinski. "IBM Payment Software to Run Atop App Server," InternetWeek, Nov. 1999. No. 790, p. 9. [Accessed May 29, 2013—ProQuest] http://search.proquest.com/docview/226906024.
Kutler et al. "MasterCard, IBM Team Up for E-Wallet Distribution," American Banker, Sep. 15, 1999. vol. 164, No. 177. [Accessed May 29, 2013—ProQuest] http://search.proquest.com/docview/249853957.
Malhotra. "Wireless Group Makes Strides, Still Faces Obstacles," American Banker, Jun. 7, 2002. vol. 167, No. 109. [Accessed May 29, 2013—ProQuest] http://search.proquest.com/docview/249855144.
Stallings. "The SET Standard & E-Commerce," Dr. Dobb's Journal, Nov. 2000. vol. 25, No. 11, pp. 30-36. [Accessed May 29, 2013—ProQuest] http://search.proquest.com/docview/202722072.
"Payments Could Be a Gold Mine Standards Remain Overriding Issue, BITS Attempts To Unite Industry," Retail Delivery System News, Feb. 13, 1998. vol. 3, No. 3, p. 1. [Accessed May 29, 2013—ProQuest] http://search.proquest.com/docview/206583755.
Petition to Institute a Covered Business Method Patent Review under Section 18 of the Leahy-Smith America Invents Act and 37 C.F.R. Section 42.300 et seq. regarding U.S. Patent No. 7,051,002 for Universal Merchant Platform for Payment Authentication, filed with the United States Patent and Trademark Office on Nov. 15, 2013.
Petition to Institute a Covered Business Method Patent Review under Section 18 of the Leahy-Smith America Invents Act and 37 C.F.R. Section 42.300 et seq. regarding U.S. Patent No. 7,693,783 for Universal Merchant Platform for Payment Authentication, filed with the United States Patent and Trademark Office on Nov. 16, 2013.
Petition to Institute a Covered Business Method Patent Review under Section 18 of the Leahy-Smith America Invents Act and 37 C.F.R. Section 42.300 et seq. regarding U.S. Patent No. 8,140,429 for Universal Merchant Platform for Payment Authentication, filed with the United States Patent and Trademark Office on Nov. 15, 2013.
Declaration of Jason Napsky in Support of Petitions for Covered Business Method Patent Review regarding U.S. Patent No. 7,051,002, U.S. Patent No. 7,693,783 and 8,140,429 for Universal Merchant Platform for Payment Authentication, executed on Nov. 13, 2013.
Declaration of Greg Wooten in Support of Petitions for Covered Business Method Patent Review regarding U.S. Patent No. 7,051,002, U.S. Patent No. 7,693,783 and 8,140,429 for Universal Merchant Platform for Payment Authentication, executed on Nov. 14, 2013.
Declaration of Sandeep Chatterjee, Ph.D. In Support of Petitions for Covered Business Method Patent Review regarding U.S. Patent No. 7,051,002, U.S. Patent No. 7,693,783 and 8,140,429 for Universal Merchant Platform for Payment Authentication.
Exhibit 1010 in Support of Petitions for Covered Business Method Patent Review regarding U.S. Patent No. 7,051,002, U.S. Patent No. 7,693,783 and 8,140,429 for Universal Merchant Platform for Payment Authentication, SOAP Version 1.2, W3C Working Draft Jul. 9, 2001, http://www.w3.org/TR/2001/WD-soap12-20010709/.

\* cited by examiner

UNIVERSAL MERCHANT PLATFORM FOR PAYMENT AUTHENTICATION

This application is a continuation of U.S. patent application Ser. No. 12/720,857, filed Mar. 10, 2010 now U.S. Pat. No. 8,140,429, is a continuation of U.S. patent application Ser. No. 11/419,829, filed May 23, 2006, which is a continuation-in-part of U.S. patent application Ser. No. 10/459,849, filed Jun. 12, 2003, which claims the benefit of U.S. Provisional Application No. 60/388,094, filed Jun. 12, 2002, all of which are incorporated herein by reference in their entirety.

FIELD

The present inventive subject matter relates to the art of authentication. It finds particular application in conjunction with facilitating the authentication of an individual to conduct a secure transaction with a credit or debit card or other payment instrument or payment means over a communications network, e.g., the Internet, and it will be described with particular reference thereto. It is to be appreciated, however, that the present inventive subject matter is also amenable to other like applications.

BACKGROUND

Internet commerce, or e-commerce as it is otherwise known, relates to the buying and selling of products and services between consumers and merchants over the Internet or other like transactional exchanges of information. The convenience of shopping over the Internet has sparked considerable interest in e-commerce on behalf of both consumers and merchants. Internet sales, or like transactions, have been typically carried out using standard credit cards such as Visa®, MasterCard®, Discover®, American Express®, or the like, or standard debit cards, i.e., check cards or automated teller machine (ATM) cards which directly access funds from an associated deposit account or other bank account. Other payment methods have also been developed for making payments in connection with e-commerce transactions. For example, these include PayPal®, Bill Me Later®, Secure eBill, Western Union, and the like.

While widely used for more traditional face-to-face transactions, use of standard cards in connection with e-commerce presents certain difficulties, including difficulties concerning authentication or positive identification of the cardholder. For example, maintaining consumer confidence in security has become difficult with increased reports of fraud. The resulting apprehension is also fueled by consumer uncertainty of the reputation or integrity of a merchant with whom the consumer is dealing. Questionable security of the consumer's card information or other personal information typically submitted along with a traditional e-commerce transaction (e.g., address, card number, phone number, etc.) serves to increase apprehension even more. Additionally, cardholders, merchants and financial institutions are all concerned about safeguarding against fraudulent or otherwise unauthorized transactions. Similarly, other payments methods are concerned with security.

Accordingly, various payment networks have implemented initiatives or programs aimed at safeguarding against fraud. For example, Visa® and MasterCard® both support authentication initiatives whereby a cardholder is authenticated by the bank or financial institution issuing the card, i.e., the issuing bank. FIG. 1, illustrates one such exemplary authentication initiative. As shown in this example, a consumer/cardholder 10, e.g., employing a suitable web browser or the like, is making an on-line purchase, e.g., over the Internet, from a merchant 20. As is known in the art, the illustrated back-end payment processing chain includes an optional payment gateway 30, the merchant's financial institution or acquiring bank 32, the credit card network 34 and the issuing bank 36.

At a point of checkout, the consumer 10 selects an appropriate payment method based on the initiatives supported by the merchant 20. At this point, the consumer fills out the on-line checkout form including a payment option, card number, expiration date, etc. Based on the payment information, the merchant 20, via a plug-in 22 installed on their server, passes a verify enrollment request (VEReq) message to a directory 38 on a server, e.g., suitably operated by the credit card network 34. The directory 38 includes a database associating participating merchants with their acquiring banks and a database associating card number ranges with locations or addresses, e.g., universal resource locator (URL) addresses, of issuing banks' authentication servers, e.g., the authentication server 40 for issuing bank 36. The VEReq message is a request to verify the enrollment of the card in the authentication program, and it contains the card number provided by the consumer 10.

Based on the card number range stored within the directory, the VEReq message will be sent to the appropriate URL address for the server 40 which returns to the merchant 20 via the directory 38 a response thereto, i.e., a verify enrollment response (VERes). That is to say, the server 40 will verify the enrollment status of the card and respond with a VERes message to the directory 38 which is then passed back to the merchant's plug-in component 22.

Based on the VERes message (i.e., if positive), the merchant plug-in component 22 will redirect the cardholder's browser to the server 40 by passing it a payer authentication request (PAReq) message generated by the merchant's plug-in component 22. The consumer 10 then completes an authentication process directly with the server 40. The authentication server 40 authenticates the consumer/cardholder 10 and responds to the merchant 20 with a payer authentication response (PARes) message including a digital signature. The merchant's plug-in component 22 validates the digital signature of the PARes and extracts the authentication status and other specified data that is to be used by the merchant 20 during the payment authorization process carried out via the back-end payment processing chain. For example, the merchant 20 sends an authorization/sale transaction to their payment gateway 30 along with the data elements received from the PARes. The payment gateway 30 routes the data to the acquiring bank 32 based on the acquirer's specification. The acquiring bank 32 then sends the data via the appropriate credit card network 34 to the issuing bank 36 for settlement.

When using authentication initiatives such as the aforementioned example, the credit card network often ensures participating merchants that fraudulent transactions and other charge backs, as they are known in the art, will not be the merchants' responsibility provided the specified protocols have been followed. However, there are considerable burdens placed upon the merchants to participate in the authentication initiatives. For example, typical installation of the merchant plug-in can be overly burdensome using up resources, i.e., computing power, memory, data storage capacity, etc., the merchant would otherwise prefer to devote to other tasks. Often, the plug-in component can be extremely large and/or cumbersome to implement on the merchant's server. Moreover, for a merchant that participates in a plurality of such authentication programs for multiple credit card networks, the burden can be that much more, i.e., requiring a separate plug-in component for each individual authentication initiative they wish to support, especially considering that each credit card network may have its own particular protocols, data fields that are employed in the respective messages, specific data format requirements, etc.

Further, the merchants are responsible for remaining current with initiative protocols that can change periodically. That is to say, as the authentication protocols are updated and/or changed by the respective credit card networks, the merchants are likewise responsible for updating and/or changing their plug-in components to reflect those update and/or changes being mandated by the credit card networks.

The present inventive subject matter contemplates a new and improved system and/or method which overcomes the above-referenced problems and others.

INCORPORATION BY REFERENCE

U.S. Provisional Application No. 60/388,049, filed Jun. 12, 2002, is incorporated herein by reference in its entirety.

SUMMARY

In accordance with one aspect of the present invention, a method is provided for supporting processing of a transaction conducted between a first party and a second party. The first party accepts payment via a plurality of different payment options selectable by the second party, and the plurality of different payment options are associated with a plurality of different authentication protocols prescribed therefor. The method includes: receiving payment information over a communications network at a server operatively connected to the communications network, the payment information identifying a particular payment option used by the second party for the transaction, and the server being equipped to format and route messages over the communications network in different manners to accommodate the plurality of different authentication protocols; determining from the payment information received at the server which of the different authentication protocols is prescribed for the type of payment option identified in the payment information; selecting, in accordance with the determination, a particular authentication protocol from the plurality of different authentication protocols supported by the server; and, obtaining an authentication determination for the transaction in accordance with the selected authentication protocol, including formatting messages and routing the formatted messages over the communications network in accordance with one or more mandates of the selected authentication protocol.

In accordance with another aspect of the present invention, a system is provided for supporting processing of a transaction conducted between a first party and a second party. The first party accepts payment via a plurality of different payment options selectable by the second party, and the plurality of different payment options are associated with a plurality of different authentication protocols prescribed therefor. The system includes: means for receiving payment information over a communications network at a server operatively connected to the communications network, the payment information identifying a particular payment option used by the second party for the transaction, and the server being equipped to format and route messages over the communications network in different manners to accommodate the plurality of different authentication protocols; means for determining from the payment information received at the server which of the different authentication protocols is prescribed for the type of payment option identified in the payment information; means for selecting, in accordance with the determination made by the means for determining, a particular authentication protocol from the plurality of different authentication protocols supported by the server; and, means for obtaining an authentication determination for the transaction in accordance with the selected authentication protocol, including means for formatting messages and routing the formatted messages over the communications network in accordance with one or more mandates of the selected authentication protocol.

Numerous advantages and benefits of the present inventive subject matter will become apparent to those of ordinary skill in the art upon reading and understanding the present specification.

BRIEF DESCRIPTION OF THE DRAWINGS

The present inventive subject matter may take form in various components and arrangements of components, and/or in various steps and arrangements of steps. The drawings are only for purposes of illustrating preferred embodiments and are not to be construed as limiting.

DETAILED DESCRIPTION OF PREFERRED EMBODIMENTS

Figure 1:
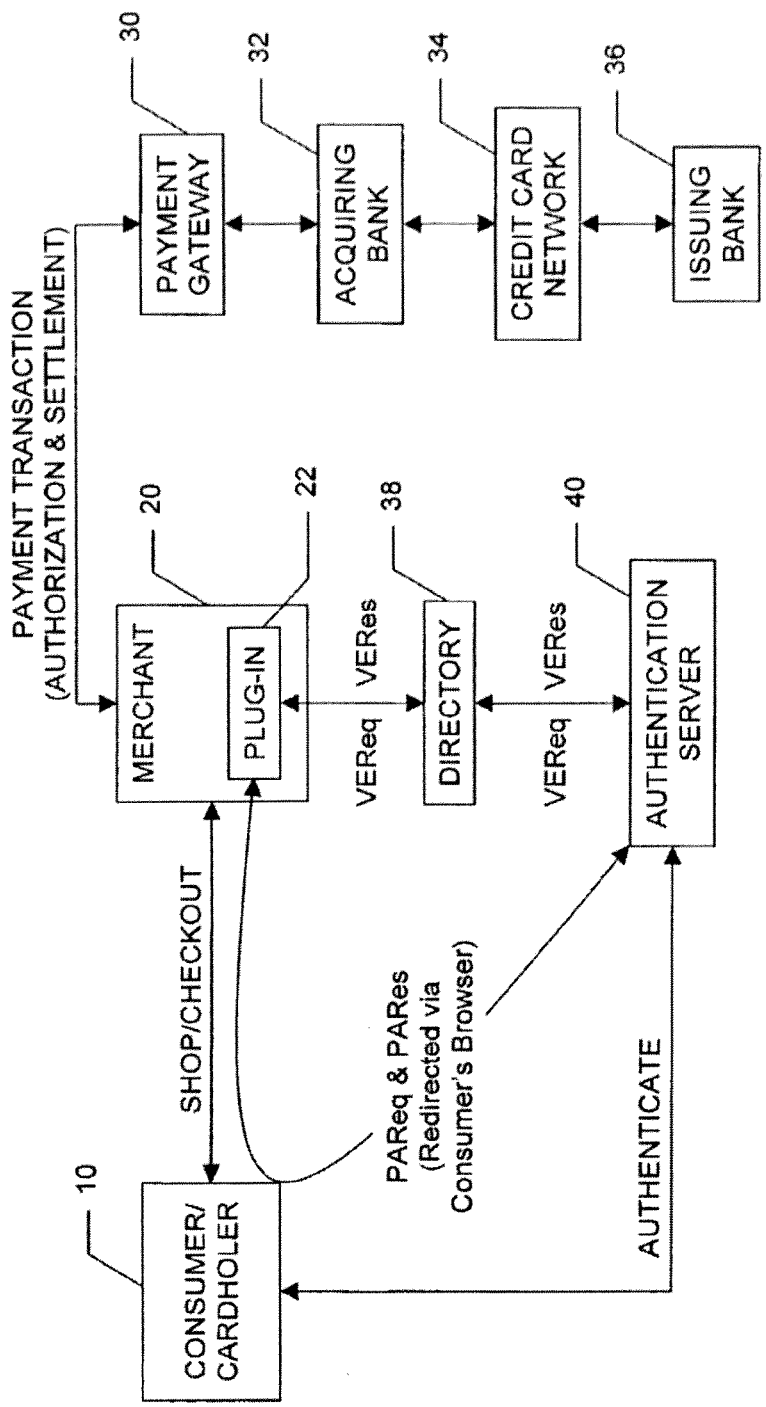
FIG. 1 is a block diagram illustrating a typical e-commerce transaction carried out in accordance with an exemplary authentication initiative/program of a credit card network.

For clarity and simplicity, the present specification shall refer to structural and/or functional network elements, entities and/or facilities, relevant standards, protocols and/or services, and other components that are commonly known in the art without further detailed explanation as to their configuration or operation except to the extent the same has been modified or altered in accordance with and/or to accommodate aspects of the present inventive subject matter.

In accordance with a preferred embodiment, the present inventive subject matter serves as a centralized merchant processing system for authenticated payments, allowing a merchant or their proxy to securely and easily accommodate authentication of consumers and/or cardholders in accordance with a variety of authentication initiatives implemented by credit card networks or other payment networks, and to process electronic transactions through any payment network using a single platform. It also enables merchants or their proxies to process these payments, regardless of which payment network they are to be routed through, with a single implementation. In one version, this is accomplished using "thin-client" communication software which links information with a centralized merchant authentication processing system (MAPS) upon demand. Moreover, it allows them or a funding source to use the established underlying payment processing infrastructure to process their credit/debit or other payment instruments at participating merchant sites.

The advantages to funding sources are: the ability to authenticate users and process all electronic transactions through a single platform; the ability to seamlessly process payments using any given payment network; a reduction in processing costs; increased use of their credit/debit or other payment instrument; increased acceptance of their credit/debit or other payment instrument; the ability to send authenticated payment and authorization requests to any network; the ability to receive detailed consumer purchasing behavior statistics. Likewise, there are advantages to the merchant, including, but not limited to: the ability to comply with, participate in, and enjoy the benefits of a variety of different authentication initiatives; the ability to authenticate consumers using different payment vehicles or credit cards, thereby avoiding lost sales; and, protection from fraud.

The approach detailed in the present specification provides a secure, scalable and modular solution for merchants to participate in and support various payment authentication initiatives, such as, e.g., Visa's 3-D Secure Verified by Visa (VbV) and MasterCard's SecureCode and/or Secure Payment Application (SPA). It provides payment gateways, acquirers, merchant service providers (MSP) and independent sales organizations (ISO) an easy and effective way to provide their merchants with the means for cardholder or account holder authentication, as defined by various authenticating programs, e.g., VbV, SecureCode, SPA, etc.

Figure 2:
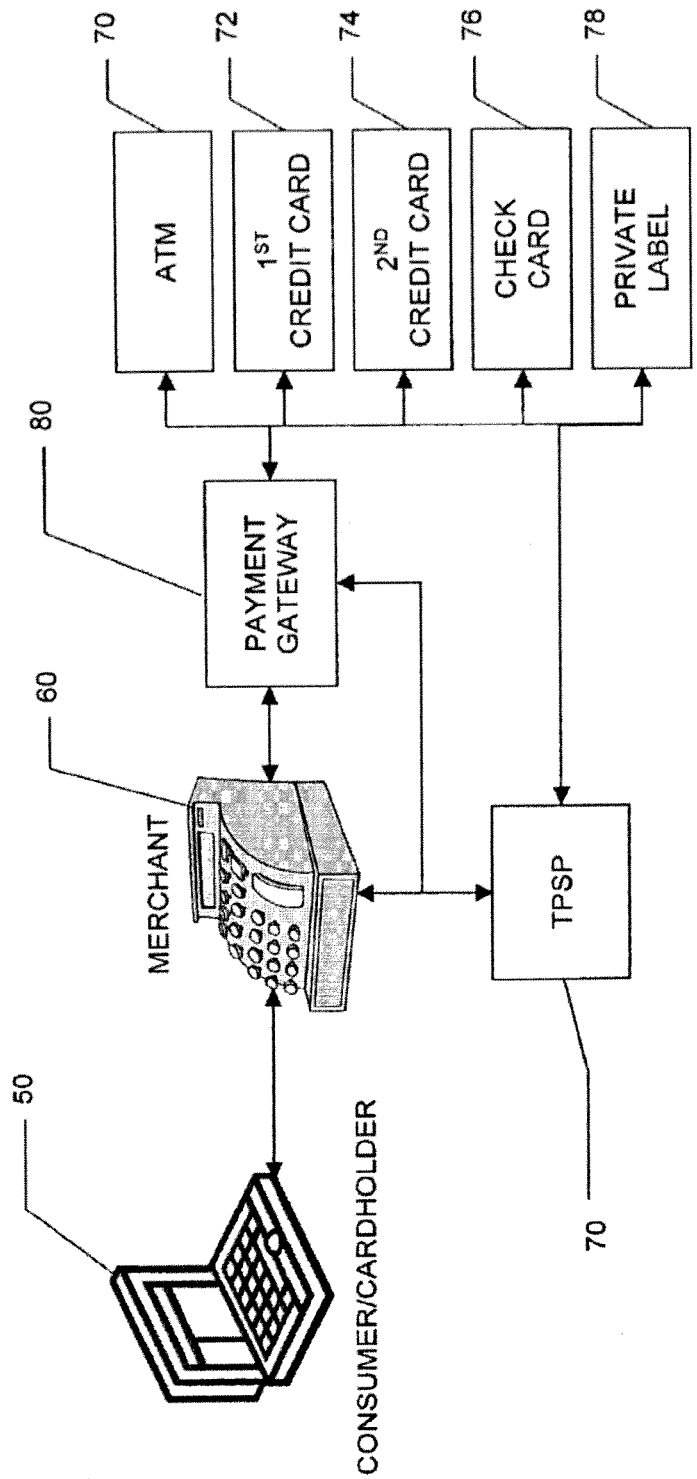
FIG. 2 is a diagrammatic illustration showing a high level overview of an exemplary processing of an authenticated commercial transaction in accordance with aspects of the present inventive subject matter.

With reference to FIG. 2, a high level overview of an exemplary commercial transaction carried out in accordance with aspect of the present inventive subject matter is diagrammatically illustrated. Via a computer, a consumer 50 shops at an on-line merchant 60 using a selected payment instrument. When the transaction is completed, transaction details are sent from the merchant 60 to a transaction processing service provider (TPSP) 70 that formats and routes various messages and takes other defined actions on behalf of the merchant 60 in accordance with authentication protocols prescribed by the payment processing network to which the payment instrument being used for the transaction belongs. For example, as shown, there is an ATM card payment processing network 70, a first credit card payment processing network 72 for a first type or brand of credit card, a second credit card payment processing network 74 for a second type or brand of credit card, a check card payment processing network 76, and a private label credit card processing network 78, all of which optionally support different authentication protocols. Of course, optionally, other types of payment processing networks may also be included. As shown, the TPSP 70 optionally obtains transactions from the merchant and distributes them to the proper payment processing networks, e.g., for direct authentication by the entity issuing the payment instrument used in the transaction. Having obtain an authentication determination, the authentication service provider 70 then returns this determination to the merchant 60 so that it may be included when the transaction is submitted by the merchant 60 to the established underlying payment processing infrastructure, e.g., via an optional payment gateway 80.

Figure 3:
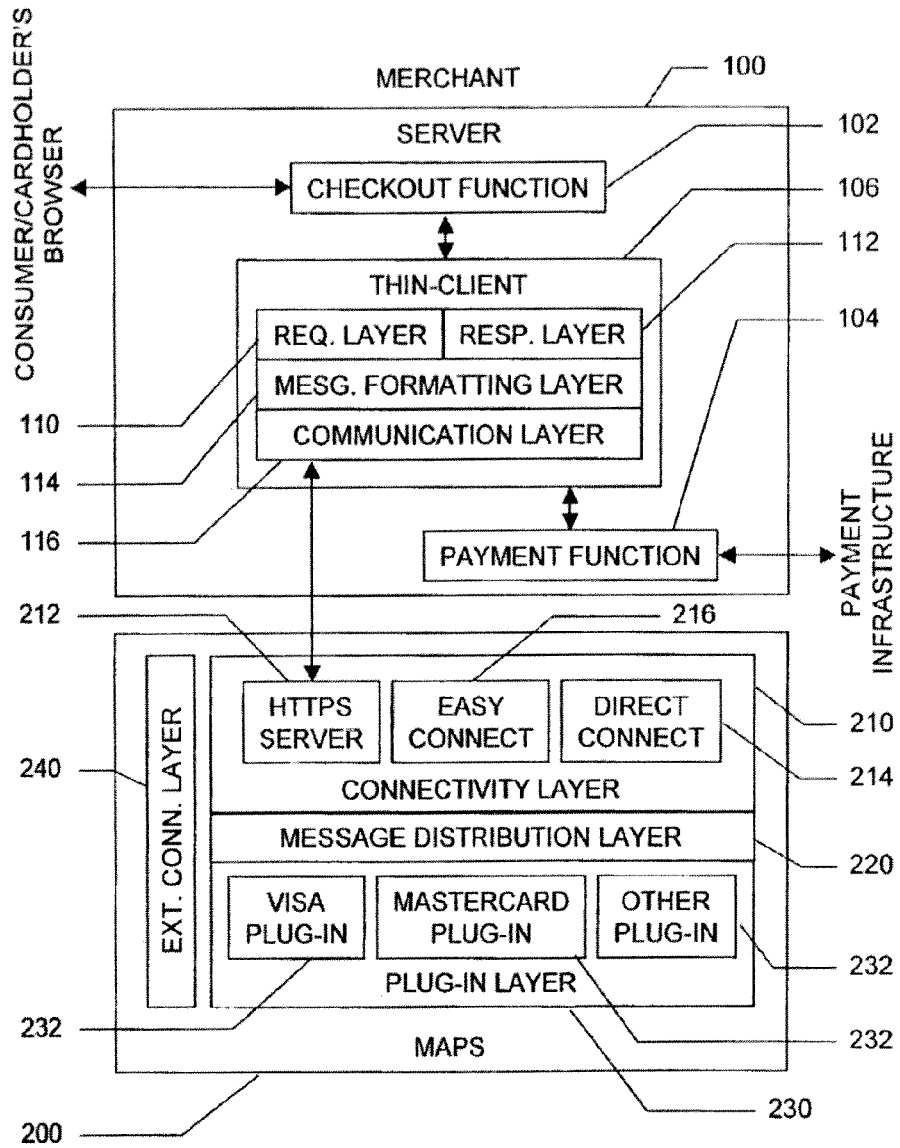
FIG. 3 is a block diagram illustrating an exemplary merchant server and exemplary merchant authentication processing system in accordance with aspects of the present inventive subject matter.

More specifically, with reference to FIG. 3, an exemplary server 100 operated by an on-line merchant and an exemplary merchant authentication processing system (MAPS) 200 are shown. The merchant server 100 includes a checkout processing function 102, a payment processing function 104 and a thin-client 106 operative to provide interworking between the server 100 and the MAPS 200. The server 100 suitably hosts a website accessible over a communications network (e.g., the Internet) by consumers/cardholders to conduct commercial transactions, i.e., to purchase good and/or services. That is to say, a consumer/cardholder using an appropriate web browser or like application may connect to the server 100 over the Internet to shop on the hosted website.

Suitably, when a consumer/cardholder is done shopping, the checkout processing function 102 is invoked thereby providing the consumer's web browser with a checkout webpage whereby the transaction amount (i.e., the total amount of payment due) is established and/or presented and payment information collected. The checkout processing function 102 supports payment with a plurality of different types of payment instruments, e.g., credit and/or debit cards, belonging to different payment processing networks, e.g., Visa®, MasterCard®, etc. Alternately, other payment options may include PayPal®, Bill Me Later®, Western Union, Secure eBill, etc. That is to say, the consumer/cardholder optionally selects the particular type of payment instrument or payment method being used for the commercial transaction from a plurality of supported payment types. Additionally, the checkout processing function 102 is also used to collect the card number, expiration date, and other relevant payment data from the consumer/cardholder.

The payment processing function 104 submits completed transactions to the established underlying payment processing infrastructure (i.e., payment gateway, acquiring bank, payment processing network, issuing bank, etc.) in the usual manner as prescribed by the various payment processing networks.

The merchant's thin-client 106 is used for communicating transaction data elements such as card number, account number or name, transaction amount, etc. between the merchant's website and the MAPS 200. The thin-client is not aware of the specific processing logic or protocols prescribed for each payment authentication initiative. Suitably, the thin-client 106 is a small software component installed on the merchant's server 100, e.g., approximately 50 kilobytes in size. Alternately, the following options for connecting to the MAPS 200 are also available in order to cater to different merchants depending upon the merchant's transaction processing volume, technical expertise, resource availability and software standards: (i) an "easy connection" implementation, as it is termed herein, i.e., a software-less merchant client; and (ii) a "direct connection" implementation, as it is termed herein, i.e., a direct integration within the MAPS 200. Nevertheless, the thin-client approach provides the merchant with a thin (i.e., small) software object (e.g., approximately 50 kilobytes) that is used by the merchant to communicate with the MAPS 200. Using the thin-client 106, the merchant can participate within the various payment authentication initiatives, e.g., VbV, SPA, etc., without any significant reprogramming of the server 100 or their website. Suitably, the thin-client 106 is available as a COM object or a Java component that is integrated with the merchant's established transaction handling process.

The thin-client software is used by the merchants to securely communicate with the MAPS. The thin-client software is used to format name/value pairs to the designated MAPS message format and securely communicate the message to the MAPS system. Suitably, the thin-client does not hold any payment authentication specific business process logic. The thin-client supports the following features: secure communication to the MAPS 200, formatting data to the MAPS specific message format, and allowing merchants to access response data.

Suitably, the architecture of the thin-client 106 includes a request layer 110 and a response layer 112 that sit on top of a message formatting layer 114 that sits on top of a communication layer 116. The request layer 110 provides an interface that can be accessed by the merchant's web site to provide data to the thin-client 106 in the form of name/value pairs. The request layer 110 also exposes functions for the merchant to send messages to a specific MAPS 200. The response layer 112 provides an interface for returning responses to the website, e.g., returned as a function call response to a send message instruction. The message formatting layer 114 formats and translates traffic between the request and response layers 110 and 112 which employ a name/value pairs format and the communication layer 116 which suitably employs an XML format to communicate with the MAPS 200. Of course optionally, other formats may also be used to communicate with the MAPS 200, e.g., Simple Object Access Protocol (SOAP), Short Message Service (SMS), a Comma Separated Value (CSV) or other like format (using flat files or batch files), etc. The communication layer 116 provides connectivity with the MAPS 200, e.g., via HTTPS (i.e., hypertext transfer protocol over secure socket layer (SSL)).

The MAPS 200 is a core component within the system. The MAPS 200 provides the functionality to merchants for participation in the various different authentication programs and initiatives supported by the payment processing networks. Suitable, the MAPS 200 architecture is extensible to support existing and new releases of existing payment initiatives without requiring a total software rewrite, and likewise accommodates addition of new authentication initiatives. This approach leads to an easy implementation at the merchant website level, i.e., where the processing logic and message handling prescribed by the initiatives are controlled at a central location rather than at an individual merchant level. That is to say, any changes or additions implemented do not affect individual merchants.

The MAPS 200 provides a secure infrastructure for processing transactions based on payment authentication initiative specifications. The MAPS 200 provides extensible software than can seamlessly support future revisions of the existing payment authentication initiatives and new payment authentication initiatives. Preferably, the MAPS 200 provides complete abstraction as to how each payment authentication initiative is implemented, thereby providing one central location for any changes. Suitably, the MAPS 200 is programmed with Java software to provide the described functionality. The MAPS software architecture includes the following layers: a connectivity layer 210 that sit on top of a message distribution layer 220 that sit on top of a plug-in layer 230, and external connection layer 240. The external connection layer 240 provides a generic interface that is used by the MAPS 200 to communicate with outside resources, e.g., the directory or the like as prescribed by various authentication protocols.

The connectivity layer 210 provides a generic layer for external entities such as merchants to connect to and process a specific payment authentication transaction. The connectivity layer 210 supports the following connectors: an HTTPS server 212; a "direct connector" 214, as it is termed herein; and, an "easy connector" 216, as it is termed herein; and an optional "other connector" 218, as it is termed herein.

The HTTPS server 212 receives and/or sends HTTP messages and communicates them to and/or from the message distribution layer 220. This connecter is used by the thin-client 106 to communicate with the MAPS 200. The direct connector 214 provides a Java interface than can be used by a merchant integrating with the MAPS 200 using the direct connection approach. This connector exposes the appropriate Java interfaces than can be used by the merchant during integration. Messages received/sent using this connector are also communicated to/from the message distribution layer 220. The easy connector 216 provides a web server that is used to communicate with the message distributor and also to communicate with the cardholder. This connector interfaces with the cardholder to perform the merchant functionality and interfaces with the message distributor to communicate the relevant messages. Suitably, the other connector 218 allows the connectivity layer 210 to be expanded to support other communication and custom integration options.

Implementing multiple connector types provides multiple ways for merchants to integrate and participate within the various authentication initiatives. By providing multiple integration approaches, a wide variety of merchants can be supported depending upon the merchant's technical expertise, resource availability and transaction processing volume. That is to say, in addition to the thin-client approach, a "direct connection" and "easy connection" approach are also optionally available to merchants.

The direct connection approach is provided for merchants which insist on or otherwise want to host and manage the product, e.g., such merchants may be high transaction volume merchants and/or merchants who have the technical resources to host and manage the product. The merchant can use direct Java calls or the like to interface with the MAPS 200 and communicate the appropriate XML or other like messages. The direct connect interface is also available via a local socket server provided as part of the MAPS 200. Merchants utilizing a software platform other than Java can use the local socket server. Under the direct connection approach the merchants provide their own hardware and/or software. On the opposite end of the spectrum, the easy connection approach is provided as a software-less integration approach for merchants that do not wish to install the thin-client 106. Using the easy connect approach, the merchant redirects the cardholder to the MAPS easy connect web server. The web server acts on behalf of the merchant's website and communicates with the MAPS 200 to provide the appropriate processing for the appropriate authentication initiative. Under this approach, the merchant redirects the cardholder using HTTPS posts and receives the responses at a specified response URL. HTTP redirections are performed via the cardholder's browser. Using the easy connection approach the merchant may place an appropriate script after the cardholder/consumer has provided the merchant with appropriate payment data, such as credit card number, expiration date, etc. The merchant receives the authentication response at the URL specified within a response URL field designated in the script.

The message distribution layer 220 is a component within the software architecture that facilitates scalability, redundancy, high availability and transaction processing speed. Suitably, the message distribution layer 220 is developed using Java 2 Enterprise Edition (J2EE) specifications related to transaction processing. It is preferably a low footprint message distribution application configured to route XML or other like messages to specific plug-in components in the plug-in layer 230 for appropriate transaction processing.

The plug-in layer 230 includes a plurality of individual authentication initiative plug-in components 232 that listen to the message distribution layer 220 for a specific message type. The respective plug-in component 232 is activated by the message distribution layer 220 that sends messages to the specified plug-in component 232 based upon the type of payment instrument or method being used for the transaction being processed. For example, as shown, the MAPS 200 optionally includes plug-in components 232 for Visa®, MasterCard® and other payment instruments or methods. Notably, the plug-in components 232 are freely and easily updated, exchanged or otherwise manipulated as desired to comply with new version of existing authentication initiatives, or additional plug-in components are freely and easily added to accommodate new initiatives, without any additional alterations to the MAPS 200 or on the merchant side. In this manner, the merchants are automatically kept in compliance with the latest authentication initiatives without having to rework authentication processing protocols on their server 100. Further, as other payment processing enhancements are introduced and/or desired, e.g., currency conversion, compliant plug-in components therefor may likewise be developed and simply added to the plug-in layer 230 of the MAPS 200 thereby providing the merchant with the particular payment processing functionality.

Additionally, the plug-in layer 230 optionally also supports various management and/or administrative applications (not shown). For example, a merchant registration application module may be made available to merchant service providers (MSPs) for registering their merchants within the appropriate payment authentication initiatives. Suitably, the merchant registration application offers a web-based application, where the merchants, based on communications received from their MSPs, can register themselves and download appropriate software and related integration documentation. The merchant registration application also provides registration/license key-based control to the MSP, where the MSP can communicate a license key to the merchant that will be used to authenticate the merchant during registration and download. Optionally, the data elements collected from the merchants can be customized as desired by the MSP.

An optional MSP administration application provides the MSP with a web-based application that is used to administer merchants. The MSP administration application may, e.g., provides the following features: enabling/disabling merchants for use of the MAPS 200; maintaining merchant profile information; etc. The MSP administration application is optionally accessed directly via XML/HTTP based application program interfaces (APIs) that may also be used to integrate with other systems. Additionally, a merchant self-service application allows the merchant to access their profile information via the web. For example, the merchant self-service application optionally offers the following features: self profile management; access to transaction history; access to raw message logs related to authentication processes; etc. The merchant self-service application may be similarly accessed directly via XML/HTTP based APIs that are optionally also used to integrate with other systems.

As another option, a MSP reporting application provides a web-based application for MSPs to view consolidated and individual transaction listings. For example, the following reports may optionally be provided as part of the MSP reporting application: consolidated transaction count/dollar volume reports; individual transaction reports; raw message logs; merchant registration reports; and/or other customized reports.

As will be appreciated by those of ordinary skill in the art, the MAPS 200 provides a method for authenticating a consumer using one of a plurality of different types of payment instruments (e.g., credit/debit cards) or payment methods to conduct a commercial transaction over a communications network with a merchant employing the MAPS 200. The payment instrument or method may be either enrolled in or not enrolled in an authentication program conforming to one of a plurality of authentication protocols prescribed for the respective plurality of different types of payment instruments by payment networks supporting the same.

Suitably, via the thin-client approach (or alternately the direct or easy connection approaches) the MAPS 200 obtains payment information for the transaction from the merchant's server 100. Suitably, the payment information includes a number or name identifying the particular payment instrument or account being used (i.e., the card number or account number or account name), an expiration date, transaction details (i.e., the transaction amount, etc), and other pertinent payment data. In the case of the thin-client approach, the payment information is obtained from the merchant's website or page via the request layer 110 in the form of name/value pairs. The request layer 110 passes the payment information to the message formatting layer 114 that translates it into an XML or otherwise appropriately formatted message and passes it to the communication layer 116. The communication layer 116 then passes the message in the XML format or other suitable format to the MAPS 200 via the HTTPS server 212 in the connectivity layer 210.

Upon receiving the payment information, the MAPS 200 determines the type of payment instrument or method being used from the payment information. Notably, the payment processing network to which a credit/debit card belongs can be determined from the card number as is known in the art.

Optionally, the MAPS 200 determines from the enrollment status of the particular payment instrument or account being used for the transaction. For example, the MAPS 200 may maintain a local cache or database of card numbers that identifies those payment instruments enrolled for participation in various authentication programs and/or initiatives. If the particular payment instrument being used is not enrolled in a particular authentication program for the determined type of payment instrument or method, then the process may be ended at this point with the MAPS 200 returning a "not enrolled" message or data back to the thin-client 106 installed on the merchant's server 100. Accordingly, the thin-client 106 passes this information to the payment processing function 104 to be bundled with the transaction data for submission of the completed transaction to the established underlying payment processing infrastructure. It is to be appreciated, that the returned "not enrolled" message or data, as with all such information returned to the merchant, is provided by the MAPS 200 through the thin-client 106 (i.e., through the communication layer 116, the message formatting layer 114 and the response layer 112) such that it emerges already formatted and/or otherwise in compliance with the appropriate authentication protocols prescribed so that the merchant does not have to manipulate the data further prior to submission to the established underlying payment processing infrastructure.

Alternately, if the particular payment instrument being used is enrolled in an authentication program, then the payment information is passed to the message distribution layer 220 that routes it to the proper plug-in component 232 in the plug-in layer 230. The plug-in component 232 then handles, administers and/or otherwise executes set procedures prescribed for the respective authentication program employing the appropriate protocols and/or logic to obtain an authentication determination for the transaction. For example, the plug-in component 232 formats and routes messages in accordance with the authentication protocols prescribed for the determined type of payment instrument or method being used. Having obtained the authentication determination, the MAPS 200 returns the same to the merchant's server 100.

Suitably, the plug-in components 232 are programmed to administer any of a variety of authentication protocols as may be prescribed for different types of payment instruments or methods support be various payment processing networks. For example, to accommodate a particular authentication initiative, a particular plug-in component 232 optionally formats and routes a messages to an issuing entity, e.g., an issuing bank having issued the particular payment instrument being used for the transaction, requesting that the issuing entity confirm the enrollment status of the particular payment instrument being used for the transaction. Upon obtaining a response to the enrollment request message from the issuing entity, the information may be returned to the merchant's server 100 in the same manner as if the MAPS 200 performed the enrollment check itself.

Additionally, once the enrollment status is determined to be positive, the operative plug-in component 232 optionally formats and routes a second message to the merchant such that the consumer/cardholder is redirected to the issuing entity for completing authentication directly therewith, whereupon the authentication determination is made. A response containing the authentication determination made by the issuing entity is then returned in accordance with routing instructions contained in the second message so that it is obtained by the MAPS 200. Suitably, the routing instructions include a universal resource locator (URL) directing the response back to the MAPS 200. Optionally, the plug-in component 232 verifies that the response to the second message was obtained from the issuing entity, e.g., by checking a digital signature incorporated with the response. The MAPS 200 is also optionally equipped to detect and/or qualitatively evaluate the level and/or type of authentication employed to arrive at the authentication determination, and this information may be communicated to the merchant or others.

To further comply with another selected authentication initiative, a particular plug-in component 232 is optionally programmed such that the MAPS 200 is equipped to dynamically add one or more data fields to the merchant's webpage so as to bring the merchant's webpage into conformity with prescribed authentication protocols for the determined type of payment instrument. Additionally, other data elements and/or fields may optionally be dynamically added, e.g., to provide currency conversion, etc.

Suitably, the MAPS 200 further includes a database (not shown) in which historical records of transactions processed by the MAPS 200 are maintained. The historical records can then be optionally accessed by the merchants or MSPs to perform audit trail and/or reconciliation operations.

It is to be appreciated that the foregoing description and the accompanying figures are merely exemplary in nature. In particular, other hardware and/or software configurations recognizable to one of ordinary skill in the art may be employed to implement the present invention, and other similar payment authentication initiatives, i.e., other than the exemplary VbV and SPA, may likewise be supported without departing from the scope of the present invention. Nevertheless, the architecture described in the present specification achieves certain benefits. For example, the availability of multiple implementation approaches (i.e., thin-client, direction connection and easy connection) allows a customized fit to a variety of differently equipped merchants based upon their transaction processing volume, technical expertise, software and/or hardware resources, etc. Further, the centralized MAPS 200 removes the burden otherwise placed on the merchant's server 100 having to support multiple payment processing initiatives providing substantially complete abstraction related to individual payment authentication initiative processing rules and logic, and with its extensible plug-in layer 230, provides availability to multiple payment authentication initiatives with one implementation on the merchant side.

Additionally, where the merchant employs a MSP to perform payment processing and/or related tasks on the merchant's behalf, it is to be appreciated that the MSP may effectively step into the position of the merchant relative to the MAPS 200. For example, rather than the thin-client 106 being installed on the individual merchant's server 100, it may be installed on the MSP's server which may use it on behalf of a single merchant or multiple merchants serviced by the MSP. That is to say, information and/or data to and/or from respective merchants would first be routed through the MSP's server where it is exposed to and/or interacts with the thin-client 106 installed thereon in essentially the same manner as described above. Of course, any other suitable proxy may similarly take the position of the merchant. Moreover, rather than returning authentication determinations and/or other transaction processing results back to the merchant, it is to be appreciated that optionally the information or results may be sent or directly forwarded from the MAPS 200 to any other selected or designated entity within the chain completing back-end processing of the completed transaction, e.g., a merchant's payment gateway, acquiring bank, payment or credit card network, issuing bank, etc.

The invention has been described with reference to the preferred embodiments. Obviously, modifications and alterations will occur to others upon a reading and understanding of this specification. It is intended that the invention be construed as including all such modifications and alterations insofar as they come within the scope of the appended claims or the equivalents thereof.

What is claimed is:

1. A method of authenticating a payment between a first party and a second party, the method comprising:
    receiving payment information from a first party over a communication network, the payment information formatted according to a generic format;
    routing the received payment information to a third party over a payment processing network, the routed payment information formatted according to an authentication protocol selected based on the payment information;
    receiving an authentication result for the payment from the third party over the payment network; and
    returning the authentication result to the first party, the returned authentication result formatted according to the generic format.

2. The method according to claim 1, wherein receiving payment information from the first party is received via a connector which includes:
    an Internet connector;
    a direct connector; or
    an easy connector.

3. The method according to claim 2, wherein the direct connector includes at least one of Java calls and extensible markup language (XML) messages.

4. The method according to claim 2, wherein the easy connector includes redirection to a webserver.

5. The method according to claim 1, wherein the generic format is independent of the first and second parties.

6. The method according to claim 1, wherein the selected authentication protocol is selected from a plurality of authentication protocols.

7. The method according to claim 1, wherein the payment network includes at least one of:
    a private network;
    the Internet;
    an automated teller machine (ATM) network; and
    a credit or debit card network.

8. The method according to claim 1, wherein an upgrade to the selected authentication protocol is independent of the first and second parties.

9. The method according to claim 6, wherein a new authentication protocol is added to the plurality of protocols without change to the generic format.

10. The method according to claim 1, wherein the generic format includes a plurality of payment instruments.

11. The method according to claim 1, wherein the generic format includes multiple currencies.

12. A system for authenticating a payment between a first party and a second party, the system comprising:
   a connection layer that receives payment information from the first part over a communication network, the received payment information formatted according to a generic format, and wherein the connection layer returns an authentication result for the payment to the first party, the returned authentication result formatted according to the generic format;
   a plug-in layer that includes a plurality of plug-ins, wherein each plug-in implements an authentication protocol that executes a set procedures to format and route the received payment information over a payment network, and wherein the plug-in layer receives the authentication results of the payment over the payment network;
   a distribution layer that selects a plug-in based on the payment information, wherein the selected plug-in formats and routes the received payment information over the payment network to a third party authenticating the payment.

13. The system according to claim 12, wherein the connection layer includes:
   an Internet connector;
   a direct connector; or
   an easy connector.

14. The system according to claim 13, wherein the direct connector includes at least one of Java calls and extensible markup language (XML) messages.

15. The system according to claim 13, wherein the easy connector includes redirection to a webserver.

16. The system according to claim 12, wherein the generic format is independent of the first and second parties.

17. The system according to claim 12, wherein the payment network includes at least one of:
   a private network;
   the Internet;
   an automated teller machine (ATM) network; and
   a credit or debit card network.

18. The system according to claim 12, wherein a change to the authentication protocol of the selected plug-in is implemented independent of the first and second parties.

19. The system according to claim 12, where a new plug-in is added that implements a new authentication protocol without change to the generic format.

20. The system according to claim 12, wherein the generic format includes a plurality of payment instruments.

21. A system for processing transactions conducted between a first party and a second party, said system comprising:
   one or more processors configured to:
      receive payment information formatted according to a first format via a communications network;
      determine an authentication protocol from the payment information
      obtain an authentication determination for the transaction in accordance with the determined authentication protocol.

22. The system of claim 21, wherein the one or more processors are further configured for returning the obtained authentication determination over the communications network to a designated entity.

23. The system of claim 22, wherein the designated entity is the first party.

24. The system of claim 22, wherein the designated entity is at least one of a payment gateway, an acquiring bank, a payment network or an issuing bank that processes the transaction.

25. The system of claim 21, wherein said first party obtained the payment information from the second party over the communications network.

26. The system of claim 21, wherein the payment information is received by a server in one of extensible markup language (XML) format, simple object access protocol (SOAP) format, or comma separated value (CSV) format.

27. A method of authenticating a payment according to an authentication protocol, the method comprising:
   receiving payment information in a generic format;
   routing the received payment information over a payment processing network, the routed payment information formatted according to an authentication protocol selected based on the payment information;
   receiving an authentication result of the payment from a third party over the payment network; and
   returning the authentication result to the first party in the generic format.

* * * * *